United States Patent [19]

Cancilla

[11] 4,069,719

[45] Jan. 24, 1978

[54] CHAIN TENSIONER FOR CHAIN DRIVES

[76] Inventor: Philip S. Cancilla, 342 Ann Darling Drive, San Jose, Calif. 95133

[21] Appl. No.: 697,352

[22] Filed: June 18, 1976

[51] Int. Cl.² ............................ F16H 7/12; F16H 7/10
[52] U.S. Cl. ........................ 74/242.11 B; 74/242.15 R
[58] Field of Search ............... 74/242.15 B, 242.11 B, 74/242.11 C, 252.14 B, 242.15 R

[56] References Cited

U.S. PATENT DOCUMENTS

| 3,580,094 | 5/1971 | Kraus | 74/242.11 C |
| 3,673,884 | 7/1972 | Southiere | 74/242.11 C X |
| 3,888,217 | 6/1975 | Hisserich | 74/242.15 R X |

FOREIGN PATENT DOCUMENTS

| 33,571 | 4/1927 | France | 74/242.15 R |

Primary Examiner—Leonard H. Gerin
Attorney, Agent, or Firm—John J. Leavitt

[57] ABSTRACT

Presented is a chain tensioner device for chain drives which, because of the environment in which the chain drives are used, must have considerable slack, while operating at high speeds, and yet remain properly engaged to the sprockets on which the chain rotates.

14 Claims, 7 Drawing Figures

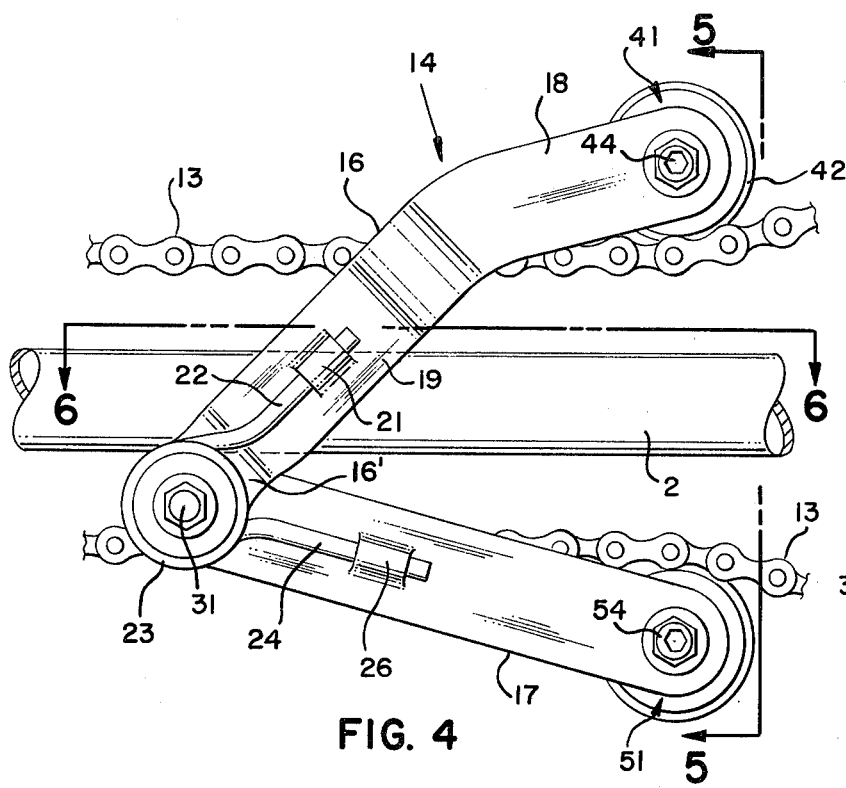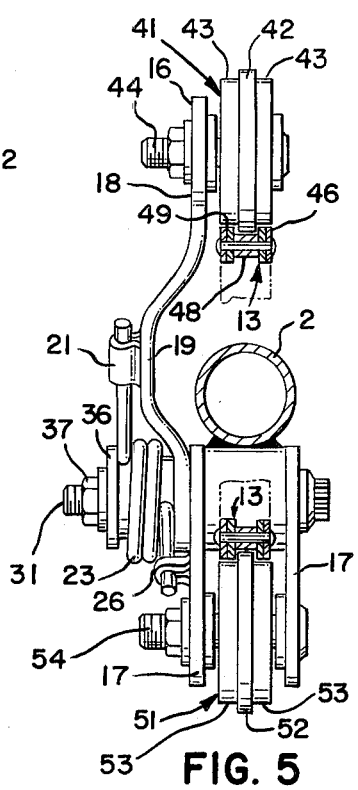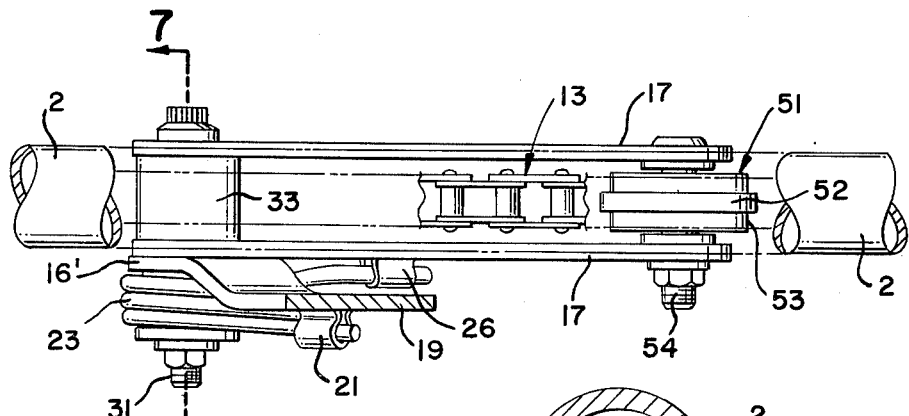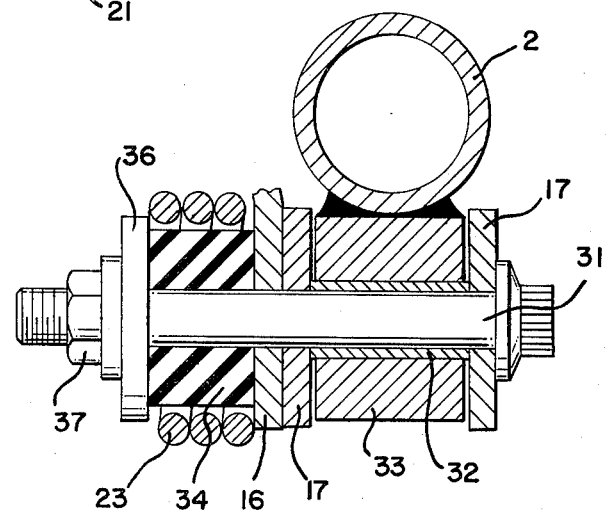
FIG. 4
FIG. 5
FIG. 6
FIG. 7

CHAIN TENSIONER FOR CHAIN DRIVES

BACKGROUND OF THE INVENTION

1. Field of the Invention

This invention relates to chain tensioners, and particularly a chain tensioning device for chain drives, such as used on motorcycles.

2. Description of the Prior Art

There has been a continuing problem created by the slack required to be provided in the chain drive of motorcycles. The slack is required because the distance between the motor drive sprocket and the wheel sprocket varies depending upon the displacement of the shock absorbers which extend between the rear wheel mounting or swing frame and the base frame on which the motor housing is secured. The existence of such slack in the chain drive results in frequent derailment of the chain from the wheel or motor sprocket which, if it occurs at high speed, can cause considerable damage to the motor, the sprocket, the frame and the rider. Attempts to control the chain under high speed operating conditions have been largely unsuccessful. For instance, U.S. Pat. No. 1,962,223 teaches the use of a tensioning mechanism in conjunction with a chain, however it is applicable to only one reach of the chain, whereas slack appears in both reaches of the chain under certain circumstances.

U.S. Pat. No. 3,448,628 relates to a device for tensioning the driving chain in a bicycle equipped with a coaster break. The necessity for a tensioning device results from the fact that as the chain shifts from one larger gear to a smaller gear the excess length of chain appearing in the lower reach of the chain must be taken up in some way. This patent teaches independent mechanisms for taking up the slack in the upper and lower reaches of a bicycle chain.

Krause U.S. Pat. No. 3,575,058 teaches the use of independent devices for tensioning the upper and lower reaches of a chain drive, the devices including a bracket adapted to be mounted on a fixed object such as a wall and projecting over the upper and lower reaches of the chain in such a way that rollers mounted on the bracket come in contact with the upper and lower reaches of the chain. This construction is primarily useful for the drive mechanisms for equipment that is fixed in place and does not appear to be applicable for mobile or motorcycle drive chains.

U.S. Pat. No. 3,677,103 also relates to a tensioning device for bicycle chains but does not teach the concept of a device operating in conjunction with both upper and lower reaches of such chains.

U.S. Pat. No. 3,785,219 relates to a device for tensioning the upper reach of a bicycle chain when the main drive sprocket is rotated in reverse to operate a coaster break. This patent does not teach the concept of a single device engaging both upper and lower reaches of the chain to accomodate slack in the chain.

U.S. Pat. No. 3,913,410 relates to a tensioning mechanism for a variable speed sprocket and chain drive assembly in which two parallel chains are driven by (or drive) a variable diameter sprocket. Spring pressed idler rollers are provided independently associated with each reach of the chain to accommodate slack in the chain when the effective diameter of the sprocket is reduced.

U.S. Pat. No. 3,463,022 also relates to a chain tensioning device, however, it utilizes hydraulics to control the slack in only one reach of the chain.

From the foregoing it will be apparent that the problems created by slack in a chain drive have been in existence for a long time. It is also apparent and surprising that no one has considered the possibility of combining in one single mechanism means for controlling the slack in both reaches of a motorcycle chain under all operating conditions. Accordingly, it is one of the principal objects of this invention to satisfy that need.

So far as is known, the relationship between the rotational axis of the rear wheel sprocket assembly of a motorcycle and the rotational axis of the motor drive sprocket is a variable one for the reason that the swing frame member on which the rear wheel is mounted is pivoted about an axis spaced from the axis of rotation of the motor drive sprocket so that the distance between the rotational axis of the wheel sprocket and the rotational axis of the motor drive sprocket varies in relation to the displacement of the rear wheel or swing frame assembly in relation to the main frame as permitted by the shock absorbors. Such variation in the distance between the rotational axes of the sprockets causes variation in the amount of slack in both the upper and lower reaches of the chain, again depending upon the degree and direction of displacement of the rear wheel in relation to the main frame as permitted by the shock absorbers. Accordingly, it is one of the principal objects of the present invention to provide a chain tensioning device that may be easily mounted on the swing frame member and which will control the slack in both reaches of the chain through all of its variations.

During the operation of a motorcycle, different slack conditions in the chain are created by different modes of operating the motorcycle. For instance, when the motorcycle is under power and is being driven by the motor, the top reach of the chain is generally taut between the upper peripheries of the motor drive and wheel sprockets, while the lower reach of the chain contains all of the slack. Accordingly, it is another object of this invention to provide a single chain tensioning device applicable to both upper and lower reaches of the chain which will accomodate all of the slack that is transferred to the lower reach of the chain when the motorcycle is being driven by the motor.

Under a different circumstance, e.g., when the motorcycle is driving the motor, the lower reach of the chain will be taut between the lower peripheries of the motor drive and wheel sprockets while the upper reach of the chain will contain all of the slack. With the motorcycle traveling at high speed, and the chain rotating rapidly under these conditions, there is a tendency for the chain to be derailed from the motor drive sprocket because of the large amount of slack. Accordingly, still another object of the invention is to provide a single chain tensioning device that will accommodate the transfer of slack from the lower reach of the chain to the upper reach of the chain under these conditions and which will keep sufficient tension on the upper reach of the chain to prevent its being inadvertently disengaged.

When a motorcycle is being operated in rough terrain, such as on dirt trails, it is normal operating procedure to accelerate and decelerate suddenly so that the transfer of slack between the upper and lower reaches of the chain will occur frequently and with suddenness on a single ride. Additionally, because of rough terrain and the necessity to lean the motorcycle precariously going around sharp curves or bends in trails, because of the large amount of slack in the chain, there is a tendency for the chain reaches to shift laterlly, thus causing derailment from the sprockets on which it is mounted. In other words, there is a tendency for the chain to be displaced laterally out of the plane of the sprockets. Accordingly, still another object of the present invention is to provide a single device capable of being attached to a frame member of the motorcycle in association with the chain drive and which will engage both reaches of the chain and prevent such lateral displacement of the chain out of the plane of the sprockets while simultaneously controlling the tension on the chain.

Because of the necessity of having a great deal of slack in the chain, there is a tendency for the motorcycle to respond slugishly to the throttle. Accordingly, it is another object of the present invention to provide a device that controls the tension in both reaches of the chain so as to improve throttle response.

It has been found that when acceleration and deceleration occur rapidly, such as in a race or on a trail, excessive slack in the chain creates a considerable amount of drive line shock. Accordingly, another object of the invention is to provide a device easily attachable to a frame member of the motorcycle and which is operative to control tension in both reaches of the chain as to eliminate or materially diminish drive line shock.

The invention possesses other objects and features of advantage, some of which, with the foregoing, will be apparent from the following description and the drawings. It is to be understood however that the invention is not limited to the embodiment illustrated and described since it may be embodied in various forms within the scope to the appended claims.

SUMMARY OF THE INVENTION

In terms of broad inclusion, the chain tensioner of the invention comprises a bracket for attachment to the rear wheel swing arm member of a motorcycle frame in association with the chain drive thereof, the bracket having pivotally mounted thereon a cooperating pair of chain engaging arms, one for each reach of the chain, the two arms being independently pivoted on the bracket and being interconnected by a coil spring that controls the tension imposed on both reaches of the chain simultaneously. Roller means are provided on the ends of the arms engaging the chain so as to guide the chain and prevent lateral displacement of the chain out of the plane of the sprockets on which it is mounted.

BRIEF DESCRIPTION OF THE DRAWING

FIG. 4 is an enlarged fragmentary side elevational view of the chain tensioner device shown in the at-rest position of FIG. 1 as it is applied to the upper and lower reaches of a motorcycle drive chain.

FIG. 5 is a vertical cross sectional view taken in the plane indicated by the line 5—5 in FIG. 4.

FIG. 6 is a horizontal cross-sectional view taken in the plane indicated by the line 6—6 in FIG. 4.

FIG. 7 is a vertical cross-sectional view taken in the plane indicated by the line 7—7 in FIG. 6 and shown enlarged to better illustrate the construction of the chain tensioning device.

DESCRIPTION OF THE PREFERRED EMBODIMENT

Figure 1:
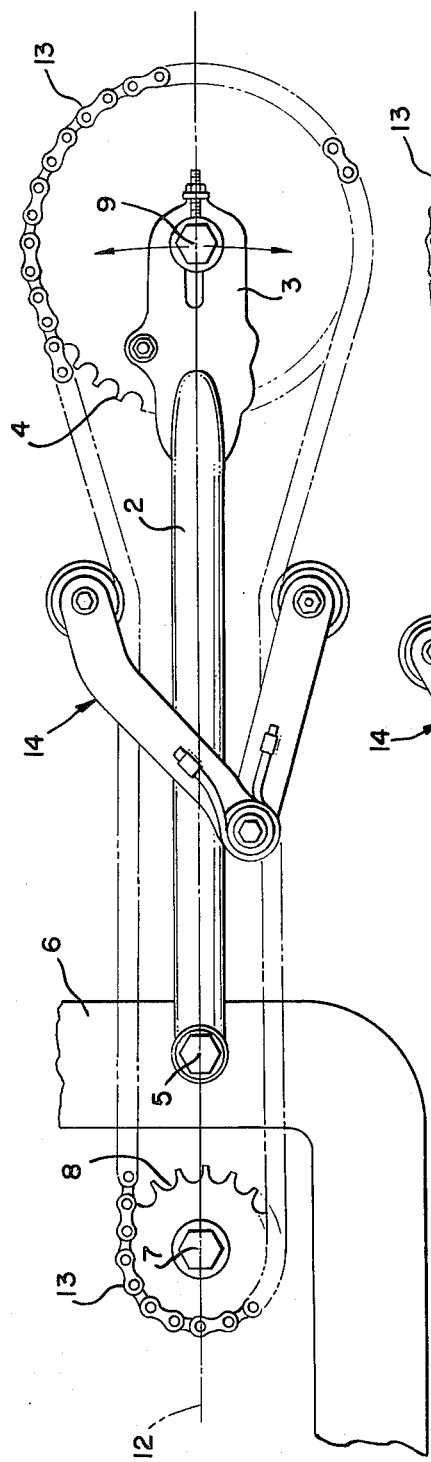
FIG. 1 is a side elevational view of a motorcycle drive train, including the motor drive sprocket, the wheel sprocket and the swing arm on which the rear wheel is rotatably mounted, showing the chain tensioning device of this invention applying tension to both reaches of the chain when the chain is at rest.
Figure 2:
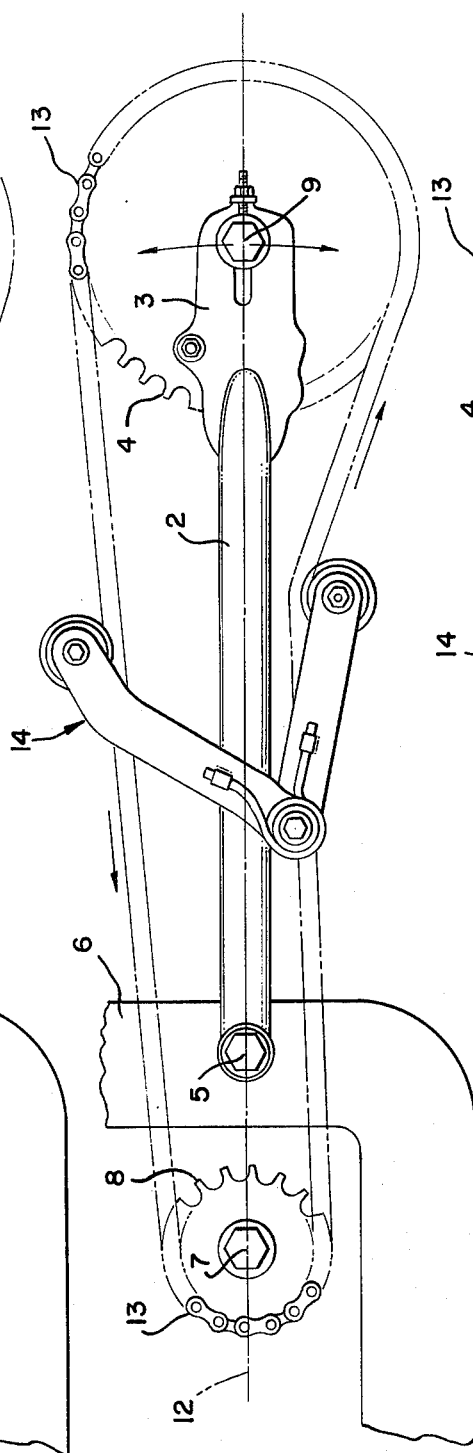
FIG. 2 is a view similar to FIG. 1, but showing the relationship of the chain tensioning device to the upper and lower reaches of the chain when the upper reach of the chain is tensioned such as when the motor is driving the motorcycle.
Figure 3:
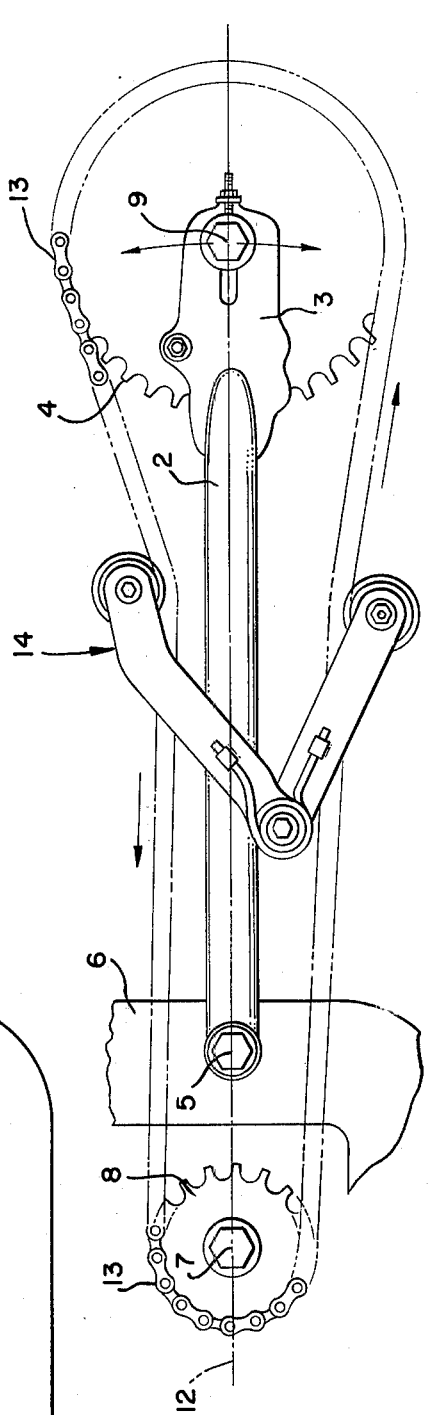
FIG. 3 is a side elevational view similar to FIGS. 1 and 2, and illustrating the relationship of the chain tensioning device with the upper and lower reaches of the chain when the lower reach of the chain is tensioned, such as when the motorcycle is driving the motor.

In terms of greater detail, the chain tensioning device of the invention in one of its aspects is adapted to be mounted on the swing arm 2 of the motorcycle on the free (rear) end 3 constituting the mounting bracket on which the rear wheel (not shown) is mounted in coaxial relationship with the wheel sprocket 4. The swing arm 2 is mounted about a pivot pin 5, on the main or base frame 6, the pivot pin 5 being spaced from the rotational axis 7 of motor drive sprocket 8. The axis of rotation 7 of the motor drive sprocket 8, the pivotal axis 5 of the swing arm 2, and the pivotal axis 9 of the wheel sprocket 4 are illustrated in FIGS. 1 through 3 in alignment and lying in a common plane designated in FIGS. 1 through 3 by the broken line 12.

It should be noted that the pivot 5 on which the swing arm 2 of the motorcycle frame is journaled is mounted on motorcycle main frame member 6, while the pivot pin 7 for the motor drive sprocket 8 is mounted on a drive shaft that projects from the motor housing of the motorcycle, the motor housing also being supported on the motorcycle main frame member 6. Thus, the relationship of the pivot pin 5 and the pivot shaft 7 is constant. This is not true however of the relationship between the rotational axis 9 of the rear wheel and wheel drive sprocket 4, and the rotational axis 5 of the swing arm 2. Thus, the height between the rotational axis 9 of the rear wheel sprocket 4 and the surface of the ground on which the wheel is supported generally is not changed to any great extent.

Conversally, the relationship of the pivot pins 5 and 7 with the ground is not constant and does change, sometimes to the extent of being displaced downwardly, six or seven inches below the plane 12 indicated in the drawings. When this occurs, it will be clear that the swing frame member 2 pivots counterclockwise about the pivot pin 5. Since there is a space between the pivot pin 5 and the pivot axis 7 of the motor drive sprocket, it will be obvious that the distance between the rotational axis 9 of the rear wheel sprocket 4 and the rotational axis of the motor drive sprocket 8 will be somewhat less than when these parts are arranged in the relationship illustrated in the drawings, in which they lie in a common plane. It will therefore be understood that such diplacement of the rotational axis 7 of motor drive sprocket 8 and pivot pin 5 of the swing frame member 2 increases the amount of slack in the chain, thus enhancing the problem of accomodating such slack without derailment of the chain from the sprocket.

To accommodate the variations in slack of the chain 13 that thus occur, there is provided a chain tensioning device designated generally by the numeral 14 and including an upper arm 16 and a pair of lower arms 17, the upper arm having a lower mounting or journal portion 16' and an upper chain-bearing portion 18 interconnected by a strap or body portion 19. The strap or body portion 19 has struck therefrom a section 21 to provide an anchor under which one leg 22 of a coil spring 23 may be caught. The spring possesses multiple coils as illustrated in FIGS. 5, 6 and 7, and the other leg 24 of the spring is caught under a section 26 struck from one of the pair of arms 17 to provide an anchor for the spring leg 24.

As illustrated in FIGS. 5, 6 and 7, the arms 16 and 17 are pivotally journaled on pivot pin 31 which extends through sleeve 32 rotatably journaled in a bearing block 33 appropriately welded to the underside of the swing frame member 2 as shown. Also mounted on the pivot pin 31 is a rubber bushing 34 that lies concentrically within the coils of the spring as illustrated and which keeps the coils concentrically centered with respect to the pivotal axis of the arms 16 and 17, and which also accommodates the increase and decrease of inside diameter of the spring coils as they flex during operation. The assembly is retained on the bearing block 33 by a washer 36 and nut 37 as illustrated.

It should be noted that the length of the sleeve 32 rotatably journaled within the bearing block 33 is such that the pair of arms 17 cannot be clamped down tightly upon the lateral ends of the bearing block 33 to thus prevent their free pivotal movement on the pin 31.

Referring to FIGS. 1 through 4, it will be seen that with respect to the upper arm 16, there is mounted on the free end of the chain-bearing portion 18 a rotatable guide wheel 41 the outer periphery of which is formed to provide a central flange 42 having shoulders 43 on opposite sides thereof. As illustrated in FIG. 5, the guide wheel is rotated about the rotational axis formed by the pin 44 and is positioned so that the flange 42 extends between the side flanges 46 of chain 13, the outer periphery of the flange 42 being in physical contact with the rollers 48 forming a part of the chain construction. The height of the flange 42 above the shoulders 43 is proportioned so that the shoulders 43 contact the associated upper edges 49 of the side flanges 46 of the chain links, to thus affectively guide the chain and confine it in the proper plane, thus precluding its displacement laterally in a manner which would result in its being derailed from the sprockets. To place the guide wheel 41 in the proper plane, i.e., the plane in which the chain lies, it should be noted that the central connecting section 19 of the upper arm 16 is offset from the plane of the mounting section 16' and the section 18 on which the guide wheel 41 is journaled. The offset of the central connecting portion 19 of the arm provides for clearance around the associated swing frame member 2 while insuring that the guide wheel 41 will be retained in a position to properly control tracking of the chain in its proper plane of operation.

Referring to FIGS. 4, 5 and 6, it should be noted that the lower pair of arms 17 are spaced apart to receive therebetween a chain guide wheel 51 having a central flange 52 and shoulders 53 on opposite sides thereof for the same purpose as described above with respect to the guide wheel 41. It should also be noted that with respect to the pair of arms 17, the lower reach 54 of the chain passes between the arms 17 and is guided therebetween by the wheel 51. Thus, even if the chain managed somehow to disengage itself from the wheel 51 it could not escape traveling in a proper track because it is confined in such track by the pair of links 17 on opposite sides thereof. Accordingly, in addition to forming a pivotal support for the guide wheel 51, the arms 17 perform an additional function in that they insure retention of the lower reach of the chain in a proper track, cooperating with the guide wheel 51, which is journaled on pin 54 as shown, that extends between the arms 17 adjacent their free end. It should also be noted that the guide wheel 41 engages the upper side of the upper reach of the chain while the guide wheel 51 engages the lower side of the lower reach of the chain.

In operation, it will be seen from FIG. 1 that when the motorcycle chain is quiescent or not operating, the tension in the spring 23 biases the arms 16 and 17 toward each other so that the wheels 41 and 51 in engagement, respectively, with the upper side of the upper reach of the chain, and the lower side of the lower reach of the chain, cause the chain to be confined between the two wheels and wrapped to a greater extent about the outer periphery of the wheel sprocket 4, thus imposing tension on both reaches of the chain simultaneously and eliminating uncontrolled slack in the chain. As soon as the motor is activated and the motor starts driving the motorcycle, counterclockwise rotation of the motor sprocket 8 imposes tension on the upper reach of the chain so that the upper reach of the chain assumes a position substantially tangential to the outer peripheries of the wheel drive sprocket and the motor drive sprocket as shown. When this occurs, it will be apparent that displacement of the upper reach of the chain causes the upper arm 16 to pivot counterclockwise, elevating the wheel 41 so that it now tracks at a higher elevation above the swing frame member 2.

At the same time, because of the resilient interconnection of the upper and lower arms through the spring 23, the pair of lower arms 17 will be elevated toward the underside of the swing frame member 2. It should be understood however that the lower arms 17 are independently pivotal with respect to the upper arm 16 so that the lower arms are permitted to find their appropriate position in view of the independent forces acting upon the lower arms, such as the weight of the lower reach of the chain and the centrifical force exerted by the chain because of its high speed movement. From this it should be clear that the spacing between the wheels 41 and 51 that engage the upper and lower reaches of the chain, respectively, is not constant but varies continuously depending upon the conditions imposed by operation of the motorcycle.

Assuming that FIG. 2 illustrates the relationship of the parts when the motorcycle is cruising under power, it may be imagined what occurs if a sharp bump is encountered by the motorcycle. The rear wheel and wheel sprocket bounce upward, pivoting the swing frame member 2 upward or counterclockwise. The frame on which the motor drive sprocket is journaled remains at the same elevation because of inertia, and as a consequence, the distance between the centers of rotation of the wheel sprocket and drive sprocket is reduced. Such reduction causes the upper reach of the chain to slacken somewhat, and the slack is taken up automatically by downward movement of the upper arm 16 and wheel 41. But increased slack in the upper reach of the chain results in increased tension or a reduction of slack in the lower reach, and such variation is automatically compensated by the lower arm 17 since it is resiliently interconnected with the upper arm 16. Thus, an increase of tension in the lower reach causes independent displacement of the lower arm as modified by the resilient interconnection of the two arms.

Having thus described this invention what is claimed to be new and novel and desired to be protected by United States letters patent is as follows:

I claim:

1. A chain tensioner for chain drives having upper and lower reaches revolving on drive and driven sprockets, comprising:
   a. means forming a support for the drive and driven sprockets; and
   b. means on said support engaging the upper and lower reaches of said chain adjacent said driven sprocket and operating to increase the wrap of said chain about the driven sprocket to eliminate slack in said chain.

2. The combination according to claim 1, in which said means on said support to eliminate slack in the chain includes arms pivotally mounted on said support means and extending into proximity of the upper and lower reaches of the chain adjacent the driven sprocket, and guide means on each arm engaging the associated reach of the chain.

3. In combination with a motorcycle drive train including a motor drive sprocket and a rear wheel sprocket connected by a drive chain, said rear wheel sprocket being mounted on a swing frame member pivotally mounted about an axis spaced from and disposed between the axes of rotation of said motor drive and wheel sprockets, a chain tensioner adapted to control the slack in both upper and lower reaches of the chain, comprising:
   a. means pivoted on said swing frame member and engaging the upper reach of the chain;
   b. means pivoted on said swing frame member and engaging the lower reach of the chain; and
   c. means resiliently biasing said means engaging the upper and lower reaches of the chain in directions to eliminate slack from the upper and lower reaches of the chain.

4. A chain tensioner for chain drives having upper and lower reaches revolving on drive and driven sprockets, comprising:
   a. means forming a support for the drive and driven sprockets; and
   b. means on said support engaging the upper and lower reaches of said chain adjacent said driven sprocket and operating to increase the wrap of said chain about the driven sprocket to eliminate slack in said chain;
   c. said means forming a support for the drive sprocket comprising a motorcycle motor housing, and the means forming a support for the driven sprocket comprising a swing frame member forming a part of a motorcycle frame on which the motor housing is mounted.

5. A chain tensioner for chain drives having upper and lower reaches revolving on drive and driven sprockets, comprising:
   a. means forming a support for the drive and driven sprockets; and
   b. means on said support engaging the upper and lower reaches of said chain adjacent said driven sprocket and operating to increase the wrap of said chain about the driven sprocket to eliminate slack in said chain;
   c. said drive sprocket constituting the motor drive sprocket of a motorcycle, said driven sprocket constituting the rear wheel sprocket of a motorcycle, and said rear wheel sprocket is rotatably mounted on said support means so as to swing about an axis disposed between the rotational axes of said drive and driven sprockets.

6. A chain tensioner for chain drives having upper and lower reaches revolving on drive and driven sprockets, comprising:
   a. means forming a support for the drive and driven sprockets;
   b. means on said support engaging the upper and lower reaches of said chain adjacent said driven sprocket and operating to increase the wrap of said chain about the driven sprocket to eliminate slack in said chain;
   c. said means on said support to eliminate slack in the chain including arms pivotally mounted on said support means and extending into proximity of the upper and lower reaches of the chain adjacent the driven sprocket;
   d. guide means on each arm engaging the associated reach of the chain, said arms including an upper arm associated with the upper reach of the chain; and
   e. a pair of parallel lower arms associated with the lower reach of the chain, the lower reach of the chain being disposed between said pair of parallel lower arms.

7. A chain tensioner for chain drives having upper and lower reaches revolving on drive and driven sprockets, comprising:
   a. means forming a support for the drive and driven sprockets;
   b. means on said support engaging the upper and lower reaches of said chain adjacent said driven sprocket and operating to increase the wrap of said chain about the driven sprocket to eliminate slack in said chain;
   c. said means on said support to eliminate slack in the chain including arms pivotally mounted on said support means and extending into proximity of the upper and lower reaches of the chain adjacent the driven sprocket; and
   d. guide means on each arm engaging the associated reach of the chain, said guide means on each arm comprising a wheel rotatably mounted on each arm and engaging the associated reach of the chain.

8. The combination according to claim 7, in which said guide wheels are provided with a peripheral flange defining peripheral shoulders on opposite sides thereof, said peripheral flange and peripheral shoulders engaging different portions of the associated chain to guide the chain and retain it against lateral displacement out of the plane of the sprockets.

9. In combination with a motorcycle drive train including a motor drive sprocket and a rear wheel sprocket connected by a drive chain, said rear wheel sprocket being mounted on a swing frame member pivotally mounted about an axis spaced from and disposed between the axes of rotation of said motor drive and wheel sprockets, a chain tensioner adapted to control the slack in both upper and lower reaches of the chain, comprising:
   a. means pivoted on said swing frame member and engaging the upper reach of the chain;
   b. means pivoted on said swing frame member and engaging the lower reach of the chain; and
   c. means resiliently biasing said means engaging the upper and lower reaches of the chain in directions to eliminate slack from the upper and lower reaches of the chain;
   d. said means mounted on said swing frame member and engaging the upper reach of the chain comprising a lever pivoted at one end on the swing frame member and having a guide wheel journaled on the other end, said wheel rollably engaging the upper side of the upper reach of the chain adjacent the wheel sprocket.

10. The combination according to claim 9, in which said guide wheels are provided with a peripheral flange defining peripheral shoulders on opposite sides thereof, said peripheral flange and peripheral shoulders engaging different portions of the associated chain to guide the chain and retain it against lateral displacement out of the plane of the sprockets.

11. In combination with a motorcycle drive train including a motor drive sprocket and a rear wheel sprocket connected by a drive chain, said rear wheel sprocket being mounted on a swing frame member pivotally mounted about an axis spaced from and disposed between the axes of rotation of said motor drive and wheel sprockets, a chain tensioner adapted to control the slack in both upper and lower reaches of the chain, comprising:
 a. means pivoted on said swing frame member and engaging the upper reach of the chain;
 b. means pivoted on said swing frame member and engaging the lower reach of the chain; and
 c. means resiliently biasing said means engaging the upper and lower reaches of the chain in directions to eliminate slack from the upper and lower reaches of the chain;
 d. said means mounted on said swing frame member and engaging the lower reach of the chain comprising a pair of parallel levers pivoted at one end on the swing frame member and having a guide wheel journaled between said parallel levers at the opposite end, said wheel rollably engaging the lower side of the lower reach of the chain adjacent the wheel sprocket, the chain passing beteen said parallel levers.

12. In combination with a motorcycle drive train including a motor drive sprocket and a rear wheel sprocket connected by a drive chain, said rear wheel sprocket being mounted on a swing frame member pivotally mounted about an axis spaced from and disposed between the axes of rotation of said motor drive and wheel sprockets, a chain tensioner adapted to control the slack in both upper and lower reaches of the chain, comprising:
 a. means pivoted on said swing frame member and engaging the upper reach of the chain;
 b. means pivoted on said swing frame member and engaging the lower reach of the chain; and
 c. means resiliently biasing said means engaging the upper and lower reaches of the chain in directions to eliminate slack from the upper and lower reaches of the chain;
 d. said means mounted on said swing frame member and engaging the upper and lower reaches of the chain being pivoted on said swing frame member about a common axis.

13. The combination according to claim 12 in which said means resiliently biasing said means mounted on the swing frame member and engaging the upper and lower reaches of the chain comprises a coil spring mounted on said swing frame member and concentrically disposed about said common axis, opposite ends of said spring being connected to said means engaging the upper and lower reaches of the chain.

14. In combination with a motorcycle drive train including a motor drive sprocket and a rear wheel sprocket connected by a drive chain, said rear wheel sprocket being mounted on a swing frame member pivotally mounted about an axis spaced from and disposed between the axes of rotation of said motor drive and wheel sprockets, a chain tensioner adapted to control the slack in both upper and lower reaches of the chain, comprising:
 a. means pivoted on said swing frame member and engaging the upper reach of the chain;
 b. means pivoted on said swing frame member and engaging the lower reach of the chain; and
 c. means resiliently biasing said means engaging the upper and lower reaches of the chain in directions to eliminate slack from the upper and lower reaches of the chain;
 d. said means resiliently biasing said means engaging the upper and lower reaches of the chain comprising a coil spring mounted on said swing frame member and interconnecting said means engaging the upper and lower reaches of the chain.

* * * * *